US007941566B2

(12) United States Patent
Akinpelu et al.

(10) Patent No.: US 7,941,566 B2
(45) Date of Patent: *May 10, 2011

(54) MULTI-SERVICE NETWORK SYSTEM

(75) Inventors: Akinwale Akinpelu, Middletown, NJ (US); Arshad Hussain, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,007

(22) Filed: Mar. 9, 2010

(65) Prior Publication Data

US 2010/0157996 A1 Jun. 24, 2010

Related U.S. Application Data

(63) Continuation of application No. 10/773,268, filed on Feb. 9, 2004, now Pat. No. 7,702,818.

(51) Int. Cl.
*G06F 15/16* (2006.01)
(52) U.S. Cl. ........................................ 709/251; 709/249
(58) Field of Classification Search ........... 709/249–251
See application file for complete search history.

*Primary Examiner* — Yasin Barqadle

(57) ABSTRACT

A multi-service network system which forms a wide area network connecting a plurality of metropolitan areas, including a primary network ring including at least one primary node and at least one secondary node; and a secondary network ring connecting the at least one secondary node to business premises equipment, wherein the business premises equipment are associated with respective customer premises equipment.

7 Claims, 1 Drawing Sheet

MULTI-SERVICE NETWORK SYSTEM

CROSS-REFERENCE TO RELATED APPLICATIONS

This application is a continuation of U.S. Ser. No. 10/773,268 filed Feb. 9, 2004 now U.S. Pat. No. 7,702,818 and issued a Notice of Allowance on Dec. 29, 2009.

FIELD OF THE INVENTION

The present invention is directed to a multi-service network system and, more particularly, to a multi-service network system which implements a metropolitan network architecture and provides packetized customer traffic at a customer's location.

BACKGROUND OF THE INVENTION

In recent years, facsimile machines, personal computers, modems, telephone sets and other terminal equipment have been introduced in enormous numbers in office buildings and homes. These terminal equipment, also known as customer premises equipment (CPEs), generally use an existing local carrier network for data transmission through a central telephone switching office.

In order to carry on wider communication involving these and other CPEs, multi-service networks have been implemented. In existing multi-service networks, the CPEs are connected at the respective customer premise to access devices, which are in turn connected to the central telephone switching office. The access devices then can communicate voice, data, and video traffic between the CPEs and the broader network.

However, the existing multi-service networks do not have the ability to packetize various customer traffic at the customer's location and communicate the traffic over network. Furthermore, the existing multi-service networks use access and switching devices to implement multiple services, thereby making these systems costly.

SUMMARY OF THE INVENTION

Accordingly, the present invention is directed to a multi-service network system that substantially obviates one or more problems due to the limitations and disadvantages of the background art.

An object of the present invention is to combine voice, frame relay, asynchronous transfer mode (ATM), private line, and video traffic into a single platform from customer premises.

Another object of the present invention is to carry aggregated traffic from the customer premises into a main telecommunications network as packetized traffic.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-service network system which forms a wide area network connecting a plurality of metropolitan areas, in one aspect of the present invention, includes a primary network ring including at least one primary node and at least one secondary node; and a secondary network ring connecting the at least one secondary node to business premises equipment, wherein the business premises equipment are associated with respective customer premises equipment.

In another aspect of the present invention a multi-service network system which provides voice, data and video network services to a customer, includes a primary network ring including at least one primary node and at least one secondary node; and a secondary network ring connecting the at least one secondary node to business premises equipment, wherein the business premises equipment are associated with respective customer premises equipment which aggregate customer traffic and provide the network services to a customer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute part of this application, illustrate embodiments of the invention and together with the description serve to explain the principle of the invention. In the drawings.

DETAILED DESCRIPTION OF THE PREFERRED EMBODIMENTS

Figure 1:
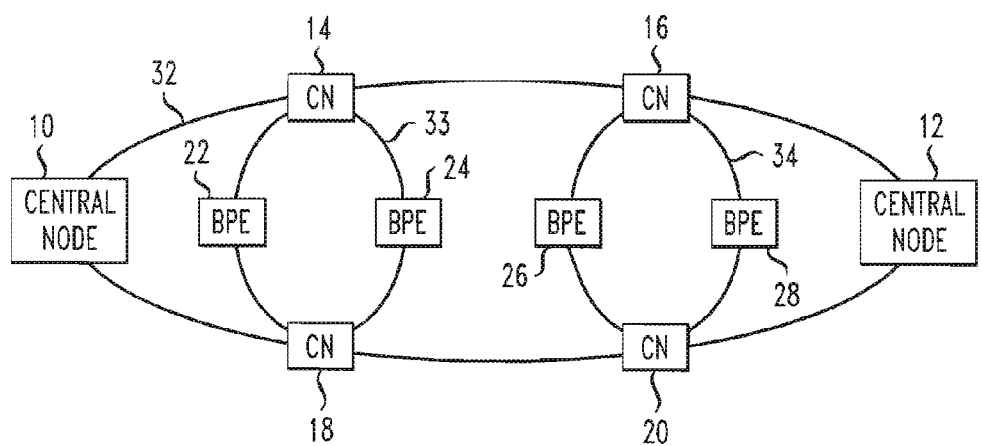
FIG. 1 illustrates a multi-service network system in accordance with an embodiment of the present invention.

Reference will now be made in detail to the preferred embodiments of the present invention, examples of which are illustrated in the accompanying drawings, wherein like reference numerals designate identical or corresponding parts throughout the several views. FIG. 1 illustrates a multi-service network system in accordance with an embodiment of the present invention. The network system preferably forms a national backbone connecting major metropolitan areas and includes a plurality of network rings for each metropolitan area.

The network system includes central nodes 10 and 12, concentration node (CN) multi-service platforms (MSPs) 14, 16, 18 and 20, business premises equipment (BPE) MSPs 22, 24, 26 and 28, and customer premises equipment (CPE) MSPs 30 and 36. The central nodes 10 and 12 are located at respective ends of a primary ring 32. The CN MSPs 14, 16, 18 and 20 are located on the primary ring 32 between the central nodes 10 and 12. The concentration nodes also form respective outer ends of secondary rings 33 and 34. The BPE MSPs 22, 24, 26 and 28 are located on the secondary rings 33 and 34 between the CN MSPs 14, 16, 18 and 20. Each BPE MSP is also connected to a CPE MSPs, where FIG. 2 shows BPE MSP 24 connected to CPE MSP 30 and BPE MSP 22 connected to CPE MSP 36.

Figure 2:
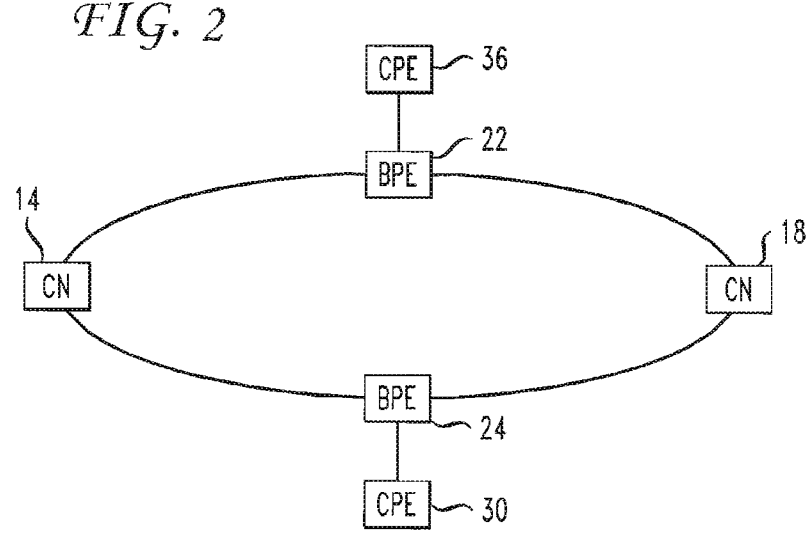
FIG. 2 illustrates a secondary ring of a multi-service network system in accordance with an embodiment of the present invention.

FIG. 2 illustrates a secondary ring of a multi-service network system in accordance with an embodiment of the present invention. In FIG. 2, the CN MSP 14 is connected through the secondary ring 33 to the BPE MSPs 22 and 24, which are located in different buildings. Each of the BPE MSPs 22 and 24 connect to a plurality of CPEs through CPE MSPs 30 and 36, respectively, preferably through tertiary rings.

The interfaces which are used in the multi-service network system according to the embodiment of the present invention preferably include E10/100 and 4×E10/100 ports, and time division multiplexing (TDM) interfaces including E3, E1 and STM-1 and STM-4. All of the interfaces are preferably optical interfaces. However, it should be understood that network interfaces may support alternative equipment and interfaces that communicate or process voice, video, and data.

The CN MSPs, BPE MSPs and CPE MSPs each have a low-speed portion and a high-speed portion. The low-speed portion of the CN MSP 14 supports Ethernet 10/100 ports and E1, E3, STM-1 and STM-4 links. The high-speed portion of the CN MSP 14 supports STM-15 or STM-64 links. The switching and cross connect supports cross connect at n×64 kbps. The CN MSP 14 preferably also supports dense wavelength division multiplexing (DWDM) and 1000 base-T. The network fibers which link to the CN MSP 14 carry extra bandwidth by combining signals from a plurality of lasers operating at different wavelengths onto a single fiber. Optical multiplexers in the links take optical signals at different wavelengths propagating on different fibers and combine them onto a single fiber. Moreover, optical amplifiers based on pumped erbium-doped fibers, for example, amplify the entire set of multiplexed optical signals on a fiber for transmission over the network.

The BPE MSPs have low-speed interfaces which are STM-1 interfaces. For example, the links which connect the BPE MSPs can be STM-1 links having a base rate of 155.520 Mbit/sec. The BPE MSPs also have high-speed interfaces which are STM-4 optical interfaces.

The BPE MSPs have bi-directional line switched ring (BLSR) or uni-directional path switched ring (UPSR) functionality. For USPR functionality, the CN MSPs and BPE MSPs on the secondary rings 33 are connected with a single optical fiber carrying data through the CN MSPs and BPE MSPs in a clockwise direction and a single optical fiber carrying data in the opposite direction. One fiber represents the so-called working path and the other represents the so-called protection path. For BLSR functionality, the working path and the protection path travel along both directions in the secondary ring 33. If a fiber is cut in the working path or a failure occurs in the CN MSPs or the BPE MSPs, data transmission is switched to the protection path.

The CPE MSPs have low-speed interfaces which support V.35 to E1 conversion, E1 and E3 interfaces (1×E3 and 3×E1) and an Ethernet 10/100 interface (4×E10/100). The CPE MSPs also have high-speed interfaces which are STM-1 interfaces, and which can incorporate APS. Preferably, at least two interfaces are provided for each customer.

The links for the BPE MSPs and CPE MSPs may also use asynchronous transfer mode (ATM) or other packet-switched protocol. The links can provide bandwidth on demand so that the available spectrum can be shared between the CPE MSPs and the BPE MSPs.

Accordingly, the present invention provides packetization of customer traffic at each CPE MSP. The customer traffic can be carried securely in its original form without requiring any additional equipment at the CPE location, thereby reducing the cost of access considerably. Thus, customers are provided multiple service needs, such as voice, data, Internet traffic, and a private line, provided by a single provider. All customer traffic is aggregated at a single CPE MSP and services are provided from this single point of access.

Other features, such as distributed operations, can be implemented in the present invention. For example, the interfaces to the backbone network can be implement within a element management system (EMS) or network management system (NMS) that monitor the network equipment. Components of the network architecture may further include EMS and NMS processors to conduct the monitoring. The EMS and NMS systems can also support functions such as distribution of announcements, service logic and prompts to individual voice processors, for example.

Numerous additional modifications and variations of the present invention are possible in light of the above teachings. It is therefore to be understood that within the scope of the appended claims, the invention may be practiced otherwise than as specifically described herein.

What is claimed is:

1. A method of providing voice, data and video network services to a plurality of separate customer premises locations comprising the steps of:
   creating a primary network ring including at least one central node and at least two concentration nodes;
   creating a secondary network ring including at least one business premises equipment multi-service platform, the secondary network ring for connecting the at least one business premises equipment multi-services platform between the at least two concentration nodes of the primary network ring; and
   creating a separate customer premises equipment multi-service platform connected to each business premises equipment multi-services platform, the customer premises equipment platform for:
      receiving customer traffic from a plurality of customer locations in its original form;
      packetizing and aggregating separate voice, data, and video traffic streams from the customer into a single traffic stream; and
      presenting the packetized and aggregated traffic streams to the associated business premises equipment multi-service platform.

2. The method as defined in claim 1 wherein the at least one business premises equipment multi-service platform performs the steps of:
   creating at least one low speed connection to a first set of services of the multi-service network services; and
   creating at least one high speed connection to a second set of services of the multi-service network services.

3. The method as defined in claim 2 wherein the created at least one low speed connection comprises an STM-1 connection.

4. The method as defined in claim 2 wherein the created at least one high speed connection comprises an STM-4 connection.

5. The method as defined in claim 1 wherein the customer premises equipment multi-service platform performs the steps of:
   creating at least one low speed connection to a first set of services of the multi-service network services to a plurality of customers; and
   creating at least one high speed connection to a second set of services of the multi-service network services to the plurality of customers.

6. The method as defined in claim 5 wherein the created at least one low speed connection is selected from the group consisting of: V.35 to E1 conversion, E1 and E3.

7. The method as defined in claim 5 wherein the created at least one high speed connection comprises an STM-1 connection.

* * * * *